United States Patent [19]
Corll

[11] 3,910,702
[45] Oct. 7, 1975

[54] APPARATUS FOR DETECTING PARTICLES EMPLOYING APERTURED LIGHT EMITTING DEVICE

[75] Inventor: James A. Corll, Los Alamos, N. Mex.

[73] Assignee: Particle Technology, Inc., Los Alamos, N. Mex.

[22] Filed: Feb. 12, 1974

[21] Appl. No.: 441,754

[52] U.S. Cl. ............ 356/72; 250/222 PC; 250/461; 250/552; 324/71 CP; 331/94.5 H; 356/73; 356/103
[51] Int. Cl.² .................. G01N 21/00; G01N 15/02
[58] Field of Search ......... 356/39, 72, 73, 102, 103, 356/104, 209; 250/552, 553, 574, 222 PC, 302, 461; 324/71 CP

[56] References Cited
UNITED STATES PATENTS
3,710,933  1/1973  Fulwyler et al. ...................... 356/39
3,770,349  11/1973  Legorreta-Sanchez ............ 250/574

*Primary Examiner*—Vincent P. McGraw
*Attorney, Agent, or Firm*—Silverman & Cass, Ltd.

[57] ABSTRACT

An apparatus for detecting particles suspended in a fluid medium wherein the particles pass through a light path modulating the light path and wherein the light path modulation is detected to detect the particles. The apparatus includes a light emitting device having an aperture passing through the device. The light path is developed by the device within the aperture interior and transverse to the aperture.

41 Claims, 4 Drawing Figures

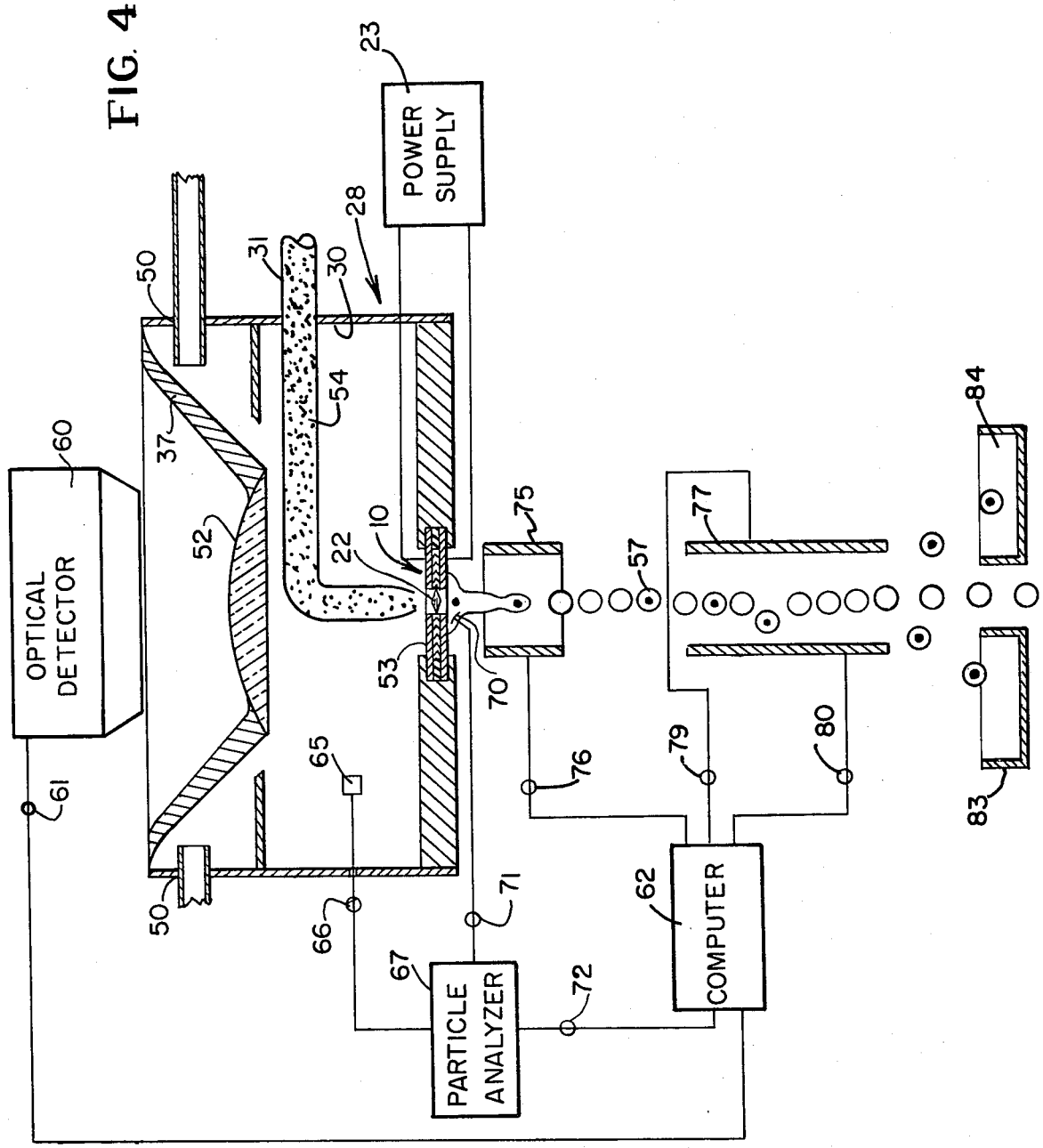

3,910,702

APPARATUS FOR DETECTING PARTICLES EMPLOYING APERTURED LIGHT EMITTING DEVICE

BACKGROUND OF THE INVENTION

An apparatus capable of detecting and identifying microscopic particles suspended in a fluid medium presently is extremely useful in a number of fields. For example, medical science particularly is interested in the detection and identification of biological cells such as blood cells via use of such apparatus. A number of different types of apparatus are available, and are presently used for the detection and identification of microscopic particles, one example being a particle detector such as is described in U.S. Pat. No. 2,656,508. This patent describes a now well-known Coulter type particle detector wherein particles suspended in a conductive fluid medium are passed through a microscopic aperture and modulate a current also passing through the microscopic aperture. This modulated current can be analyzed to identify certain characteristics of the particles, and it may also be used to count the number of particles.

Although this device has been used successfull for a number of years, the number of particle characteristics which can be identified and analyzed using the Coulter principle is limited.

Another type of apparatus for identifying particles suspended in a fluid medium is known as an optical particle detector. Such a device is shown and described in U.S. Pat. No. 3,497,690. In this apparatus particles suspended in a fluid medium are passed through a light beam and the scattered or reflected light is detected. The intensity and duration of the scattered light can be analyzed in order to identify certain characteristics of the particles. In an apparatus such as described in the above noted patent, complex optical systems are employed in order to overcome the difficulty of focusing a light source on the particles. Other types of apparatus employ complex fluid channelizing equipment in order to make the particles flow through a fixed light path. Both types of optical detectors require a source of light creating a light path, apparatus for passing particles through the light path and optical detectors for detecting the reflected light.

U.S. Patent application Ser. No. 188,123, filed Oct. 12, 1971 describes an optical particle detector wherein a path of light developed by a separate light source is directed through an aperture or hole in a PIN diode. The PIN diode is a photodetector which develops an electrical signal in response to the light scattered by particles passing through the light path. This electrical signal can be analyzed in order to identify certain characteristics of the particle passing through the light path. This detector however requires fluid channelizing equipment as previously noted for containing the particles while passing through the light path.

Although optical detectors are quite complex, they are capable of analyzing and identifying a greater number of characteristics than can be analyzed and identified by use of a Coulter type particle detector. The Coulter type particle detector will however, provide a more accurate analysis of certain particle characteristics.

Apparatuses are also available for separating different types of particles suspended in a fluid medium. This type of apparatus charges a droplet containing a particle in accordance with predetermined characteristics of the particle. The particle may then be passed through deflection plates which will deflect the charged particle into separate collection trays for each type of particle to be collected. However, this apparatus requires that all the particles in the fluid suspension be previously identified.

SUMMARY OF THE INVENTION

It is an object of this invention to provide a particle detector employing an optical detection system less complex than heretofore available.

An apparatus for detecting particles suspended in a fluid medium is provided which includes a light emitting diode coupled to a source of electrical potential. The light emitting diode has a bore passing therethrough and develops a path of light, in response to application of the electrical potential, interior to the bore and transverse to the axis of the bore. Particles suspended in a fluid medium are coupled to the bore in the light emitting diode and passed through the bore. Passage of the particles through the light path within the bore causes modulation of the light path. A photodetector positioned adjacent the bore is operative in response to the modulated light to develop a detection signal which varies in accordance with the modulation. The signal is coupled to an analyzer where it is analyzed to identify particular characteristics of the particle.

The bore in the light emitting diode may also be used as a Coulter aperture in a Coulter type particle detector in order to provide additional and/or more accurate analysis and identification of particular characteristics of the particles. The Coulter type particle detector and the analyzer may additionally be coupled to a particle separator via logic circuitry such as a computer in order to provide information to the separator regarding the particle characteristics which will enable the separator to properly charge the various particles for deflection into different collection trays.

BRIEF DESCRIPTION OF THE DRAWINGS

FIG. 4 is a sectional view of another embodiment of the apparatus of this invention embodying the device shown in FIGS. 1 and 2.

DESCRIPTION OF THE PREFERRED EMBODIMENT

Figure 1:
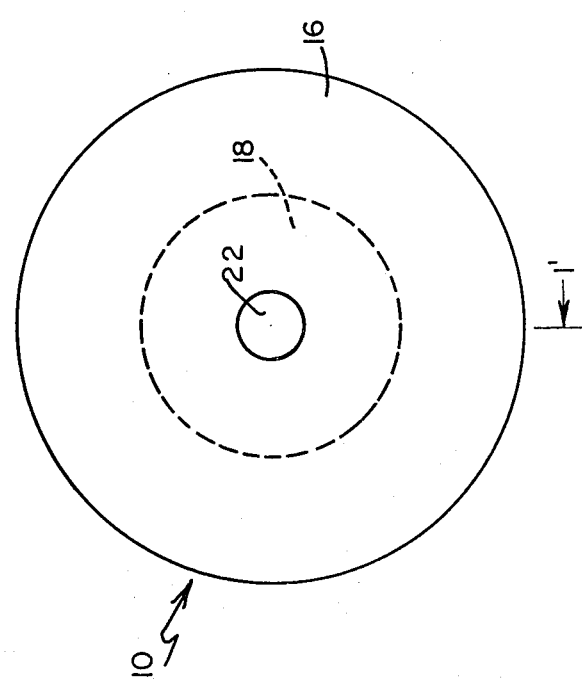
FIG. 1 shows a plan view of the light emitting device of this invention.
Figure 2:
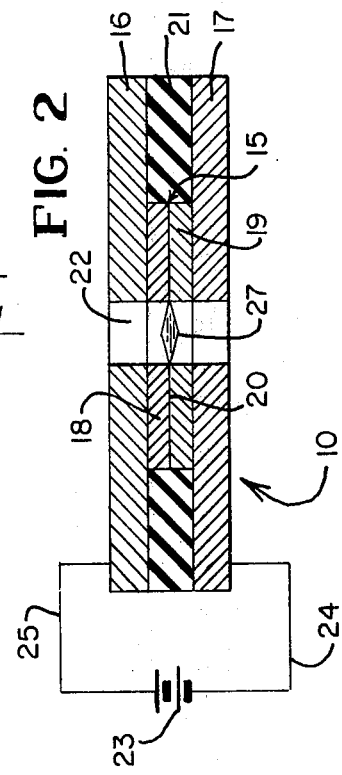
FIG. 2 shows a sectional view of the device shown in FIG. 1 taken along the section lines 1—1'.

FIGS. 1 and 2 show a light emitting semiconductor device according to the invention generally indicated by the reference character 10. In FIGS. 1 and 2 the semiconductor device 10 has not been drawn to scale but has been exaggerated in order to more clearly show the various portions of the device. There are many types of semiconductor light emitting devices currently available, among them being infrared emitting diodes and injection lasers. These devices are commonly referred to as light emitting diodes or LED's. The device shown in the drawings will hereinafter be identified by the term LED.

LED 10 has a circular semiconductor wafer 15 sandwiched between two electrical conductors (electrodes)

16 and 17 which are also circular in shape and have a diameter greater than the diameter of semiconductor wafer 15. Semiconductor wafer 15 has a layer of P material 18, a layer of N material 19 and a junction 20 disposed between the P material 18 and the N material 19. Junction 20 is commonly referred to as a PN junction. Optically opaque electrically insulating material 21 surrounds semiconductor wafer 15 and extends from the peripheral edge of semiconductor wafer 15 to the peripheral edge of conductors 16 and 17. The optically opaque material 21 provides electrical insulation between conductors 16 and 17 and provides isolation for wafer 15 from air, humidity and other contaminants.

The LED 10 is constructed to emit light when properly electrically biased due to the characteristics of the semiconductor materials employed. For example, gallium arsenide is often used and has unique physical characteristics which permit emission of relatively high light levels upon application of relatively low power.

In the embodiment shown, a bore 22 is cut through the center of LED 10 in a direction transverse to the plane of conductors 16 and 17 and semiconductor wafer 15. The bore 22 is microscopic in size and can have a diameter in the order of 50 or 100 microns. It is to be understood however, that the bore 22 can have any diameter desired and can, for example, have a diameter of 250, 500 or 1000 microns. A battery or power supply 23 is coupled to LED 10 via conductors 24 and 25 in order to supply an electrical potential or bias to LED 10. The electrical potential will cause LED 10 to emit a light path or a plane of light 27 from PN junction 20 into bore 22 transverse to the axis of bore 22. a particle of microscopic dimension entering bore 22, when it intersects the light plane 27 will cause a modulation of the light plane 27. This modulation can take the form of reflecting light from the light plane 27 in a direction substantially parallel to the axis of bore 22 such that the reflected light passes out of bore 22. This reflected light can be used to detect and identify microscopic particles as more fully described subsequently in this application.

Figure 3:
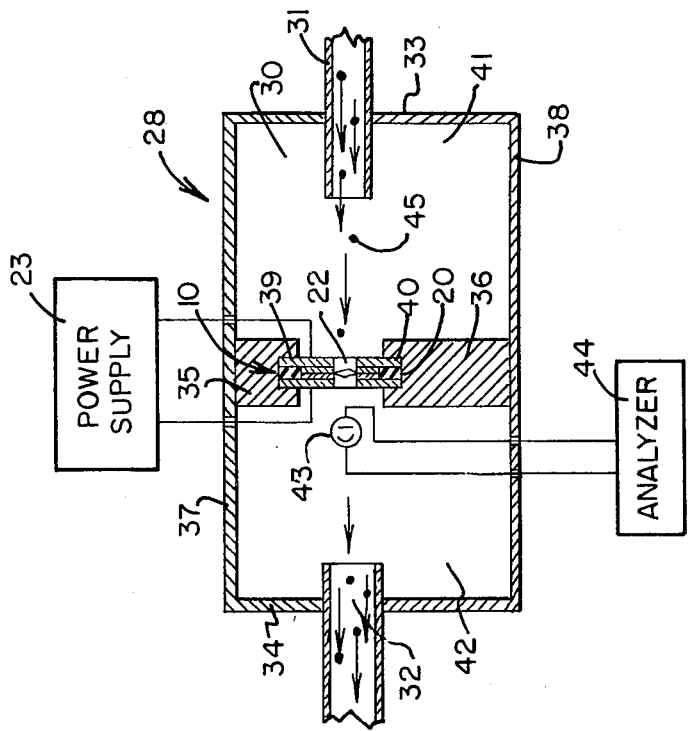
FIG. 3 is a sectional view of an apparatus of this invention employing the device shown in FIGS. 1 and 2.

Referring to FIG. 3, an apparatus incorporating the LED 10 of FIGS. 1 and 2, is shown for detecting particles in a fluid such as air. A housing 28 has a chamber 30 formed therein. An entry port 31 and exit port 32 are formed in side walls 33 and 34 respectively of housing 28. Mounting blocks 35 and 36 are secured to top and bottom walls 37 and 38 respectively in chamber 30. LED 10 is positioned in mounting depressions 39 and 40 of mounting blocks 35 and 36 respectively with the axis of bore 22 aligned with entry port 31 and exit port 32. Mounting blocks 35 and 36 and LED 10 divide chamber 30 into a first portion 41 and second portion 42 with bore 22 providing the only connection between portion 42 with bore 22 providing the only connection between portions 41 and 42. A power supply 23 is coupled to LED 10 as shown and described with reference to FIGS 1 and 2. A photoelectric device 43, such as for example a photocell, is positioned interior to second portion 42 of chamber 30, between LED 10 and exit port 32, and adjacent bore 22. Photoelectric device 43 is coupled to an analyzer 44 located anterior to housing 28.

In operation, power supply 23 causes excitation of LED 10 and the emission of a light plane 27 from PN junction 20 into bore 22 and transverse to the axis of bore 22 as previously described with reference to FIGS. 1 and 2. Air, containing particles to be detected, such as particle 45 is coupled into housing 28 via entry port 31 and projected through a first portion 41 of chamber 30 towards bore 22. As a particle passes through bore 22, it will intersect the light plane 27 causing some of the light to reflect in a direction substantially parallel to the axis of bore 22 and pass out of bore 22 towards photoelectric device 43. Photoelectric device 43 is a device such as commonly known in the art which will develop an electronic current in response to light striking the device. The amplitude and duration of the electrical current produced will be proportional to the intensity and duration of the light detected by photoelectric device 43. The current developed by photoelectric device 43 in response to the reflected light is coupled to analyzer 44 which can determine characteristics such as the size or optical density of particle 45 in response to the amplitude and duration of the electrical current, as well as count the passage of particles 45. If the rate of flow of air into and out of housing 28 can be determined, as accurate count of the number of particles per unit volume can be determined. This device will then allow analysis of particle concentrations and may be used, for example, to monitor pollution in cities and even in clean rooms and in operating rooms where the amount of potentially contaminating particles can seriously effect the results of surgical procedures.

Referring now to FIG. 4, there is shown another embodiment of the apparatus of this invention. Portions of the apparatus shown in FIG. 4 which are common to the apparatus shown in FIG. 3 and/or perform the same functions as are performed by the elements shown in FIG. 3 are given the same numbers as shown in FIG. 3. In this apparatus, housing 28 is cylindrically shaped and defines a chamber 30. An entry port 31 is formed in one side wall 33 of cylindrical shaped housing 28. Additional entry ports 50 are formed at a number of locations in side wall 33 of housing 28 so as to form a circle of additional entry ports in side wall 33. A circular collection lens 52 is mounted in circular top wall 37. Circular bottom wall 38 has a circular aperture 53 formed therein. LED 10 is mounted in aperture 53 in the same manner as shown in FIG. 3, with bore 22 of LED 10 axially aligned with the axis of collection lens 52 and perpendicular to the plane surface of collection lens 52. A fluid conduit 54 couples entry port 31 to a point adjacent to bore 22 in LED 10. Bore 22 in LED 10 provides an exit port from chamber 30.

An optical detector 60 is positioned adjacent collection lens 52 anterior to housing 28. Optical detector 60 is coupled via conductor 61 to computer 62. An electrode 65 is positioned in chamber 30 of housing 28 and is connected via conductor 66 to particle analyzer 67. a second electrode 70 is located adjacent bore 22 of LED 10, and is coupled via conductor 71 to particle analyzer 67. Particle analyzer 67 is coupled via conductor 72 to computer 62.

Charging ring 75 positioned below exit bore 22 is coupled to computer 62 via conductor 76; and deflection plates 77 and 78 positioned bleow charging ring 75 are coupled to computer 62 via conductors 79 and 80 respectively.

In the embodiment shown in FIG. 4 the particles to be detected and identified, for example, biological cells such as blood cells, are first stained so that they will fluoresce when passed through light plane 27. It is to be understood, however, that staining is described only by way of example, and that the particles such as blood cells can fluoresce when exposed to particular wavelengths of light such as can be produced by LED 10. The stained particles are then diluted in an electrolyte fluid whose electrical conductivity is different than the electrical conductivity of the blood cells. The fluid with blood cells suspended therein is injected into chamber 30 of housing 28 via entry port 31 and directed to an area adjacent bore 22 in LED 10 by fluid conduit 54. Additional electrolyte is introduced into chamber 30 via entry port 50 such that the additional electrolyte provides a sheath surrounding the electrolyte from fluid conduit 54, directing the fluid electrolyte with blood cells suspended therein from fluid conduit 54 to bore 22 in LED 10. As a blood cell suspended in the fluid electrolyte passes through light plane 27 in bore 22 it will fluoresce and emit light of a particular wavelength which is determined by the physical characteristics of the particular cell passing through bore 22, the type of staining used to stain the blood cell, and the particular wavelengths of the light in light plane 27. This, of course, is in addition to reflecting light from bore 22 whose intensity and duration is related to size and optical density of the blood cell. The reflected light, and the light generated by the fluorescence of the blood cell passing through light plane 27 will be acccumulated by collection lens 52 and coupled to optical detector 60. Optical detector 60 will convert the light intensity and duration, and the wavelengths of light developed as a result of the fluorescence of the blood cell to binary signals which are coupled via conductor 61 to computer 62. Computer 58 will compare these binary signals to binary signals representative of the characteristics of different types of blood cells in order to determine the type of blood cell wich has passed through bore 22. In addition, computer 58 can count the detection in order to accumulate information as to the number and/or concentration of each particular type of blood cell detected.

Lens 52 and optical detector 60 can, if desired, be used only to detect the particular wavelength of the light emitted due to the fluorescence of the blood cell passed through bore 22. Particle analyzer 67 may be used to generate an electrical current between electrodes 65 and 70 which passes through the electrolyte and through bore 22 in LED 10. It being understood of course that electrode 70 is always completely immersed in the electrolyte such as for example by being placed in the meniscus formed at bore 22 or by being placed in bore 22. LED 10 and bore 22 then form a Coulter aperture such as is now well known in the art. The passage of the biological cell such as a blood cell through bore 22 of LED 10 will modulate the current passing between electrodes 65 and 70 in accordance with the now well known Coulter principle. This modulated current will be detected by particle analyzer 67 which will analyze the magnitude and duration of the modulated current in order to determine the size of the cell in accordance with principles now well known in the art and described in U.S. Pat. No. 2,656,508 previously noted. The information as to particle size can be coupled from particle analyzer 67 to computer 62 via conductor 72, along with information as to wavelength of light produced due to the fluorescence of the blood cell, coupled from optical detector 60 to computer 62 via conductor 61. This information in combination can then be used by computer 62 as previously noted to identify the particular type of blood cell passed through bore 22 in LED 10.

It is to be understood that LED 10 can be employed as previously described in the above apparatuses with additional features now well known in the art. For example, each biological cell or blood cell passing through bore 22 in a fluid medium is contained in a droplet 57, formed as the fluid stream exiting bore 22 breaks into droplets. Computer 62 can energize charging ring 75 to place a charge on each of the droplets 57 containing a particle of interest as the fluid stream passes through the charging ring 75 and breaks into the droplets 57. The magnitude and/or polarity of the charge can be different for each type cell which is capable of being detected and identified by computer 62. An electrical potential may then be applied to deflection plates 77 and 78 by computer 62 creating an electrical field between deflection plates 77 and 78. The electrical field will cause the charged droplets, that is, those droplets containing particles of interest, to accelerate in the direction of the field created with an acceleration proportional to the charge on the droplets. The droplets containing particles of interest are thus deflected into one of collection trays 83 and 84 for later analysis and study of the particular cells accumulated while the droplets which are empty or contain particles which are not of interest are not deflected into one of collection trays 83 and 84. Although it is believed that particle separators which form droplets around particles and separate the particles by deflecting the droplets into collection trays as well known in the art; and it is further believed that the above description of such apparatus is sufficient, further reference can be made to U.S. Pat. No. 3,380,584 which shows and describes one form of such an apparatus.

It is believed that the foregoing will enable those skilled in the art to practice the invention and appreciate its scope as defined in the followiwng claims.

What it is desired to be claimed and secured by Letters Patent of the United States is:

1. An apparatus for detecting particles suspended in a fluid medium including in combination:
   a light emitting device for developing a plane of light, said light emitting device having a bore therethrough, said plane of light extending interior to said bore and transverse to the axis of said bore,
   means for coupling the particles suspended in the fluid medium to said bore, and
   detection means for detecting a first signal developed in response to said particles passing through said bore and through said plane of light.

2. The apparatus of claim 1 further including counter means coupled to said detection means and operative in response to said first signal to count the particles.

3. The apparatus of claim 1 wherein said first signal is a reflected light signal developed in response to the particles passing through said plane of light, said reflected light signal extending in a direction substantially parallel to the axis of said bore, said detection means including light detection means for detecting said reflected light.

4. The apparatus of claim 3 wherein said light detection means includes photoresponsive means operative in response to said reflected light to develop second signals.

5. The apparatus of claim 4 further including counter means coupled to said photoresponsive means and operative in response to said second signals to count the particles.

6. The apparatus of claim 4 wherein the particles have particular characteristics, said reflected light having an intensity related to said particular particle characteristics, said photoresponsive means including photoelectric means operative to develop electrical second signals varying in accordance with the intensity of said reflected light.

7. The apparatus of claim 6 further including analyzer means coupled to said photoelectric means and operative in response to said electrical second signals to identify said particular particle characteristics.

8. The apparatus of claim 4 wherein the particles have particular characteristics, said reflected light having a duration related to said particular particle characteristics, said photoresponsive means including photoelectric means operative to develop electrical second signals varying in accordance with the duration of said reflected light.

9. The apparatus of claim 8 further including analyzer means coupled to said photoelectric means and operative in response to said electrical second signals to identify said particular particle characteristics.

10. The apparatus of claim 1 wherein the particles suspended in the fluid medium passing through said plane of light in said bore fluoresce in response to said plane of light and develop said signal, said first signal including particular wavelengths of light related to particular characteristics of the particles, said detection means including light detector means for detecting said particular wavelengths of light.

11. The apparatus of claim 10 further including analyzer means coupled to said light detector means and operative in response to said first signal including particular wavelengths of light to identify the particular characteristics of the particles.

12. The apparatus of claim 11 wherein said analyzer means further includes counter means operative in response to said first signal to count the particles.

13. The apparatus of claim 1 wherein the particles suspended in the fluid medium passing through said plane of light in said bore fluoresce in response to said plane of light and develop a second signal, said second signal including particular wavelengths of light related to particular characteristics of the particles and light detector means for detecting said second signals.

14. The apparatus of claim 13 further including analyzer means coupled to said light detector means and operative in response to said second signal including particular wavelengths of light to identify said particular characteristics of the particles.

15. The apparatus of claim 14 further including counter means coupled to said detection means and operative in response to said first signal to count said particles.

16. The apparatus of claim 1 further including housing means defining a chamber therein, said means for coupling the particles suspended in said fluid medium to said bore including entry means formed in said housing, mounting means secured in said chamber for mounting said light emitting device, said bore forming a passage from said chamber, the fluid medium being introduced into said entry means, said bore means allowing exit of the fluid medium.

17. The apparatus of claim 16 wherein the fluid medium has a conductivity different than the particles and including means for establishing a stable electrical current path through said bore, the particles passing through said bore modulating said current, and current detecting means operative in response to said modulated current to develop a second signal.

18. The apparatus of claim 16 wherein said first signal is a reflected light signal developed in response to the particles passing through said plane of light, said reflected light signal extending in a direction substantially parallel to the axis of said bore, said detection means including light detection means for detecting said reflected light.

19. The apparatus of claim 18 wherein the particles have particular characteristics, said reflected light having at least one of an intensity and duration related to said particular particle characteristics, said light detection means including photoelectric detection means operative to develop electrical first signals varying in accordance with at least one of the intensity and duration of said reflected light.

20. The apparatus of claim 19 wherein said light emitting device includes at least one light emitting diode.

21. The apparatus of claim 19 further including analyzer means coupled to said photoelectric detection means and operative in response to said electrical first signals to identify said particular particle characteristics.

22. The apparatus of claim 20 wherein said analyzer means includes counter means operative in response to said electrical signals first to count the particles.

23. An apparatus for optically detecting particles suspended in a fluid medium wherein the particles pass through a light path modulating the light path and wherein the modulated light path is detected for optically detecting the particles, comprising a light emitting semiconductor device for developing the light path, said device having an aperture passing therethrough, the light path extending interior to said aperture and transverse thereto.

24. The apparatus of claim 20 further including a source of electrical potential coupled to said light emitting device, said light emitting device being operative in response to said electrical potential to develop said light path.

25. The apparatus of claim 23 wherein said light emitting device is a light emitting diode.

26. the apparatus of claim 23 further including photoresponsive means operative to detect the modulation of the light path for optically detecting the particles.

27. The apparatus of claim 26 wherein said photoresponsive means includes photoelectric detector means operative in response to the modulation of the light path to develop a first signal and detection means coupled to said photoelectric means and operative in response to said first signal to detect the particles.

28. The apparatus of claim 27 wherein said detection means includes analyzer means operative in response to said first signal to identify particular characteristics of the particles.

29. The apparatus of claim 27 wherein said detection means includes counter means operative in response to said first signal to count passage of the particles through said light path.

30. An apparatus for detecting particles suspended in a fluid medium including in combination, a semiconductor device having a bore passing therethrough, said semiconductor device being operative to develop a light path extending interior to said bore and transverse to the axis of said bore, means for coupling the particles suspended in the fluid medium to said bore for passing the particles through said bore and, detection means for detecting modulation of said light path in response to the particles in said fluid medium passing through said bore and through said light path.

31. The apparatus of claim 30 further including a source of electrical potential coupled to said semiconductor device, said semiconductor device being operative in response to application of said electrical potential to develop said light path.

32. The apparatus of claim 30 wherein said semiconductor device is a light emitting diode.

33. The apparatus of claim 30 wherein said detection means includes photoelectric means operative in response to modulation of said light path to develop a first signal, and detector means coupled to said photoelectric means and operative in response to said first signal to detect the particles.

34. The apparatus of claim 33 wherein the particles have particular characteristics, said light path being modulated in accordance with said particular particle characteristics, said first signal developed by said photoelectric means varying in accordance with said modulation of said light path, said detector means including first analyzer means operative in responce to said varying first signal to identify said particular particle characteristics.

35. The apparatus of claim 34 wherein said bore in said semiconductor device forms a Coulter aperture and further including, current means for establishing an electrical current path through said aperture, said current path being modulated by passage of the particles through said bore, and current detection means coupled to said current means and operative in response to modulation of said current path to detect the passage of the particles.

36. The apparatus of claim 35 wherein the particles fluoresce in response to passage through said light path and develop particular wavelengths of light related to particular characteristics of said particles and further including, optical detection means operative in response to receipt of said particular wavelengths of light to develop second signals representative of said particular characteristics, and second analyzer means coupled to said optical detector means and operative in response to said second signals to identify said particular particle characteristics.

37. The apparatus of claim 36 further including, droplet developing means operative to form a droplet of the fluid medium surrounding each of the particles upon passage of the particles through said bore, charging means operative in response to passage of said droplet to charge said droplet to a predetermined potential, and, deflection means operative in response to passage of said charged droplet to deflect said droplet in a path in accordance with the charge on said droplet.

38. The apparatus of claim 37 wherein said first analyzer means develops first identification signals for identifying said particular particle characteristics and said second analyzer means develops second identification signals for identifying said particular particle characteristics, and further including logic means coupled to said first and second analyzer means and said charging means and operative in response to said first and second identification signals to charge said droplet to said predetermined potential.

39. The apparatus of claim 38 wherein said current detection means develops current detection signals in response to said modulation of said current path, said logic circuit means being further operative in response to said current detection signals to charge said droplet to said predetermined potential.

40. The apparatus of claim 39 wherein said logic circuit means is a computer.

41. The apparatus of claim 40 wherein said semiconductor device is a light emitting diode.

* * * * *

UNITED STATES PATENT AND TRADEMARK OFFICE
CERTIFICATE OF CORRECTION

PATENT NO. : 3,910,702

DATED :

INVENTOR(S) : James A. Corll

It is certified that error appears in the above-identified patent and that said Letters Patent are hereby corrected as shown below:

Column 3, line 33, change "a" to "A";

Column 3, lines 55 and 56, omit repeated material starting with "portion 42" and ending with "connection between".

Column 4, line 54, change "a" to "A";

Column 4, line 60, change "bleow" to --below --.

Column 7, line 28, after "said" (first occurrence) insert -- first --.

Signed and Sealed this fifteenth Day of June 1976

[SEAL]

Attest:

RUTH C. MASON
Attesting Officer

C. MARSHALL DANN
Commissioner of Patents and Trademarks